J. M. COMB AND C. E. PEAVEY.
MACHINE FOR COOKING DOUGHNUTS.
APPLICATION FILED APR. 16, 1919.
1,333,389.
Patented Mar. 9, 1920.
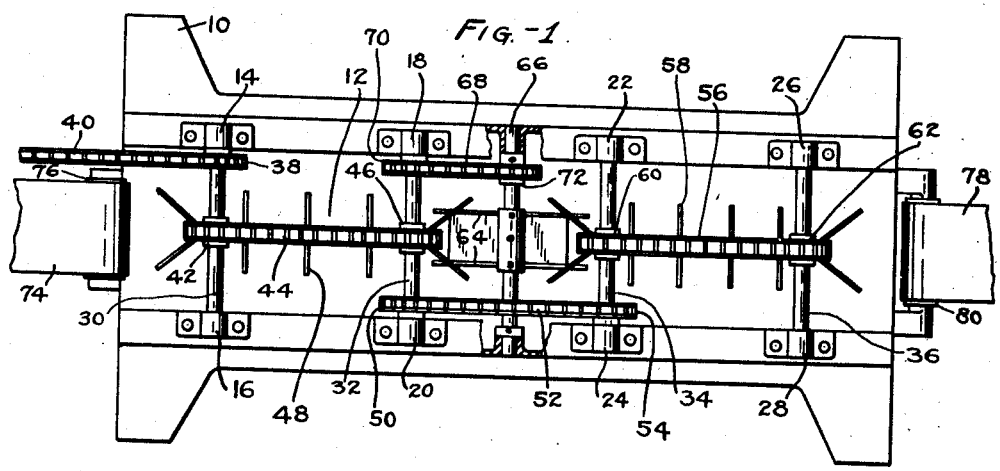
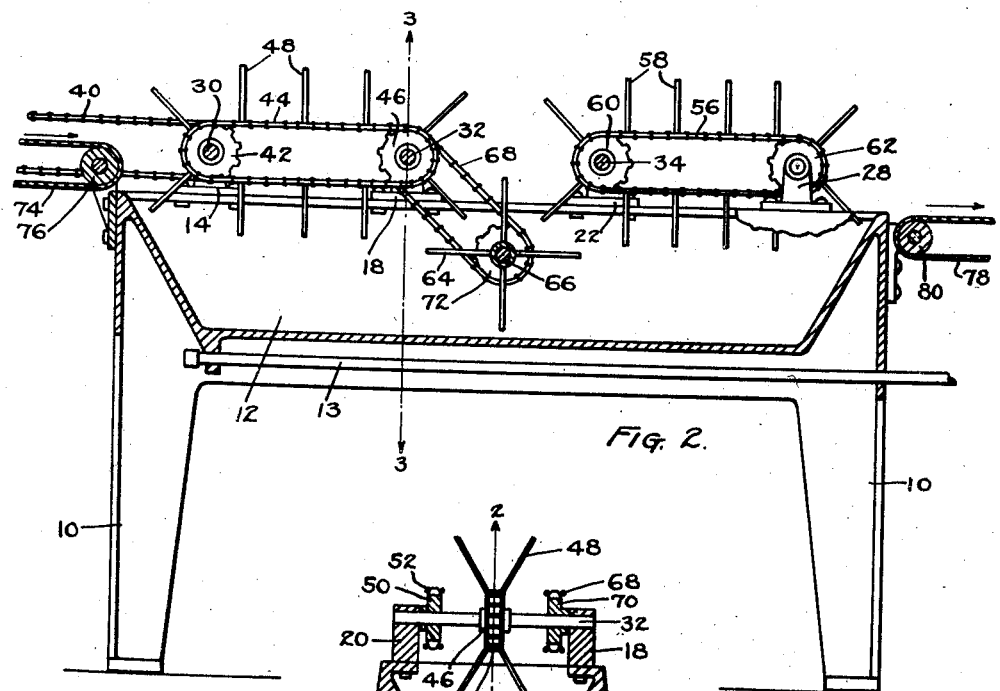
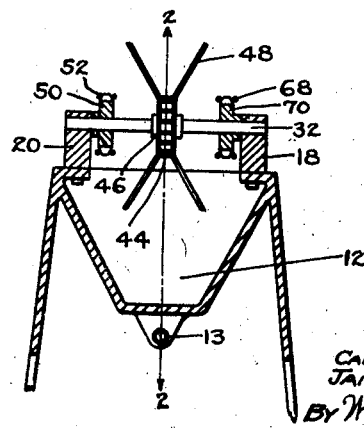
INVENTORS:
CARLYLE EDWIN PEAVEY.
JAMES MAITLAND COMB
By Whiteley and Ruckman
THEIR ATTORNEYS.

UNITED STATES PATENT OFFICE.

JAMES MAITLAND COMB AND CARLYLE EDWIN PEAVEY, OF MINNEAPOLIS, MINNESOTA, ASSIGNORS OF FORTY-NINE ONE-HUNDREDTHS TO FALK J. YOUNKER, JACOB LINCE, AND MINOR SILBERBERG, ALL OF DES MOINES, IOWA.

MACHINE FOR COOKING DOUGHNUTS.

1,333,389. Specification of Letters Patent. Patented Mar. 9, 1920.

Application filed April 16, 1919. Serial No. 290,394.

*To all whom it may concern:*

Be it known that we, JAMES MAITLAND COMB and CARLYLE EDWIN PEAVEY, citizens of the United States, residing at Minneapolis, in the county of Hennepin and State of Minnesota, have invented certain new and useful Improvements in Machines for Cooking Doughnuts, of which the following is a specification.

Our invention relates to machines for cooking doughnuts and an object is to provide a machine for cooking or frying doughnuts in grease, or deep fat, without manual handling of the doughnuts. Another object is to provide a machine of this class, in which the doughnuts will be conveyed through hot grease contained in a receptacle and will be turned over during their progress through the receptacle so as to be uniformly cooked on both sides.

The full objects and advantages of our invention will appear in connection with the detailed description thereof, and the novel features embodied in our inventive idea will be particularly pointed out in the claims.

In the drawings which illustrate the application of our invention in one form,—

Figure 1 is a top plan view. Fig. 2 is a longitudinal view on the line 2—2 of Fig. 3. Fig. 3 is a view on the line 3—3 of Fig. 2.

The support for the machine includes legs 10 and a table portion provided with a receptacle 12 for the grease or fat, underneath which is a gas burner 13 for heating the receptacle. The table is provided with bearing members 14, 16, 18, 20, 22, 24, 26 and 28. The bearing members and the support may be conveniently made as a solid casting. Shafts 30, 32, 34 and 36 are mounted in the bearing members. A sprocket wheel 38 is secured to the shaft 30 and a driving chain 40 runs over this sprocket. A sprocket wheel 42 is also secured to the shaft 30 and a sprocket chain 44 runs over this sprocket and over a sprocket 46 secured to the shaft 32. The sprocket chain is provided with outstanding wire fingers 48, the chain being arranged to extend centrally and longitudinally over the receptacle to carry the fingers along so that the ends, on the lower travel of the chain, extend below the level of the hot grease in the receptacle. A sprocket wheel 50 is secured to the shaft 32 and a sprocket chain 52 connects the sprocket wheel 50 with a sprocket wheel 54 secured to the shaft 36 so that the latter is driven thereby. The chain 56, having wire fingers 58, similar to the fingers 48, runs over a sprocket wheel 60 on the shaft 36 and a sprocket wheel 62 on the shaft 38. A paddle wheel has blades 64 secured to a shaft 66 mounted in the side walls of the receptacle. This paddle wheel is interposed between the sprocket chains 44 and 56 and is driven by a sprocket chain 68 running over sprocket wheels 70 and 72 secured respectively to the shafts 32 and 66. An endless conveyer belt 74 runs over a roller 76 rotatably mounted slightly above the receiving end of the receptacle and an endless conveyer belt 78 runs over a roller 80 rotatably mounted below the delivery end of the receptacle.

Throughout this application the term "doughnut" is used broadly and is intended to cover any food article of like character.

The operation and advantages of our invention will be apparent from the foregoing description. Doughnuts properly shaped are conveyed by the belt 74 and deposited in the receiving end of the hot grease receptacle and are conveyed by the fingers 48 until they reach the paddle wheel located at, or near, the middle of the receptacle. The blades of the paddle wheel push the doughnuts down one at a time and carry them around through one hundred eighty degrees, thus turning them over, whereupon they are taken by the fingers 58 and conveyed to the delivery end of the receptacle where the fingers lift them and deposit them on the belt 78.

We claim:

1. A machine for cooking doughnuts comprising a receptacle for grease, means for heating said receptacle, means for conveying doughnuts partly through said receptacle, a paddle wheel for turning over the doughnuts, and means for conveying the doughnuts through the remainder of said receptacle after they have been turned.

2. A machine for cooking doughnuts comprising a receptacle for grease, means for heating said receptacle, two endless chains having outstanding fingers for conveying the doughnuts through said receptacle, and a paddle wheel interposed between said chains for turning over the doughnuts.

3. A machine for cooking doughnuts comprising a receptacle for grease, means for heating said receptacle, a conveyer belt for carrying the doughnuts to said receptacle, two endless chains having outstanding fingers for conveying doughnuts through said receptacle, a paddle wheel interposed between said chains for turning over the doughnuts, and a conveyer belt for carrying the cooked doughnuts away from said receptacle.

In testimony whereof we hereunto affix our signatures.

JAMES MAITLAND COMB.
CARLYLE EDWIN PEAVEY.